J. BURKE.
Hose-Spanner.

No. 165,707.

Patented July 20, 1875.

WITNESSES:
C. Neveux
A. F. Terry

INVENTOR:
J. Burke
BY
[signature]
ATTORNEYS.

UNITED STATES PATENT OFFICE.

JOHN BURKE, OF NEWBURYPORT, MASSACHUSETTS.

IMPROVEMENT IN HOSE-SPANNERS.

Specification forming part of Letters Patent No. 165,707, dated July 20, 1875; application filed April 17, 1875.

*To all whom it may concern:*

Be it known that I, JOHN BURKE, of Newburyport, Essex county, Massachusetts, have invented a new and useful Improvement in Spanners for Fire-Hose, of which the following is a specification:

The invention will first be described in connection with drawing, and then pointed out in the claim.

Figure 1:
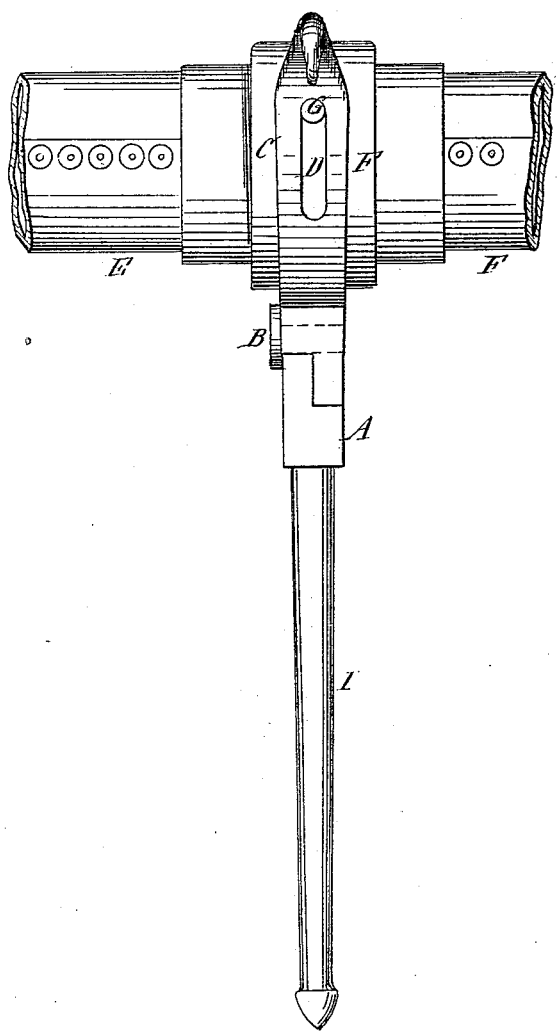
Figure 2:
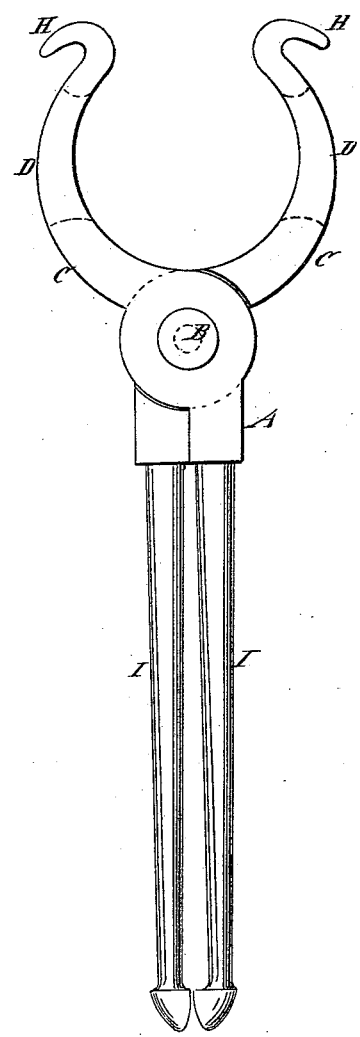

Figure 1 is an edge view of the spanner, showing it as applied to the hose; and Fig. 2 is a side view of the spanner.

Similar letters of reference indicate corresponding parts.

A represents the spanner, which is made in two parts, which are joined together by the fulcrum-pivot B, and work the same as tongs or nippers. C C are the jaws, in each of which is a slot, D. (Seen in Fig. 1, and indicated by dotted lines in Fig. 2.) E represents the hose, and F the hose-coupling. The hose-coupling has a lug, G, on each side. When the spanner is applied for coupling or uncoupling the hose these lugs enter the slot D, as seen in Fig. 1, and receive the power which is applied. H is a hook on the end of each jaw for convenience in hauling the hose from place to place by means of rings or straps attached to the hose. I are the handles of the spanner.

In patching the hose these handles set upright and spread, and the jaws form a seat for the hose, which is a great convenience to the fireman.

This spanner is designed to meet the special wants of firemen.

I am aware that it is not new to make a hose-spanner with hook on the end of each handle, and eye on the end of each jaw; but of my slots D D, set back from the ends of the jaws, the advantages are that the jaws are thus enabled to obtain a closer bite and to be adapted to hose of any size. This spanner can also be used with a one-lug hose applied with one hand and carried in the sheath of a fireman's belt.

What I claim as new and of my invention is—

The jaws of a hose-spanner, provided with slots D D at some distance back from the ends thereof, as and for the purpose specified.

JOHN BURKE.

Witnesses:
JOSEPH W. HUGHES,
F. C. L. COOKE.